3,845,066
AQUEOUS BASED THERMOSETTING ACRYL-
AMIDE-ACRYLIC COPOLYMER COATING
COMPOSITION
Joseph A. Vasta, Woodbury, N.J., assignor to E. I. du
Pont de Nemours and Company, Wilmington, Del.
No Drawing. Filed Nov. 1, 1973, Ser. No. 412,038
Int. Cl. C08f 37/06, 45/24
U.S. Cl. 260—29.6 WB  7 Claims

ABSTRACT OF THE DISCLOSURE

The aqueous thermosetting acrylamide-acrylic coating composition contains the following blend of film-forming constituents:

1. a water soluble acrylic polymer of
   a. isobutoxymethyl acrylamide,
   b. methyl methacrylate, styrene or a mixture thereof,
   c. an alkyl acrylate having 2-12 carbon atoms in the alkyl group or an alkyl methacrylate having 4-12 carbon atoms in the alkyl group, and
   d. sufficient acrylic acid or methacrylic acid to provide an acid number of 50-105;

wherein this constituent is primarily used for dispersing pigments; and 2. a water insoluble acrylic resin uniformly dispersed in the coating composition of
   a. butoxymethyl acrylamide or isobutoxymethyl acrylamide,
   b. methyl methacrylate, styrene, or a mixture thereof,
   c. an alkyl acrylate or an alkyl methacrylate, and
   d. acrylic acid or methacrylic acid;

wherein the composition is neutralized to a pH of about 7-10 with a basic compound. The composition is primarily used for the high-speed coating of coils of metal sheets which are used for constructing appliances such as stoves, refrigerators, washers and dryers and other metal articles.

BACKGROUND OF THE INVENTION

This invention relates to an aqueous-based coating composition and in particular to an aqueous thermosetting acrylamide-acrylic enamel useful for finishing metal sheets used in the manufacture of appliances.

The metal-coatings industry has been utilizing solvent-based thermosetting coating compositions prepared from acrylamide copolymers as shown by Vogel et al., U.S. 2,870,116, issued Jan. 20, 1959; Christenson, U.S. 2,978,-437, issued Apr. 9, 1961; Hart et al., U.S. 3,118,853, issued Jan. 21, 1964; and Christenson et al., U.S. 3,118,-852, issued Jan. 21, 1964. While these compositions provide high-quality finishes, these compositions do not meet current antipollution standards and, therefore, are not acceptable to the industry. Aqueous coating compositions of acrylamide copolymers are illustrated in Christenson et al., U.S. 3,247,139, issued Apr. 19, 1966, but these compositions form flat, nonglossy finishes which also are not acceptable as finishes for metal sheets used for appliances. The metal-coatings industry is in need of a high-quality nonpolluting composition which cures at a rapid rate and provides a glossy finish.

The novel aqueous composition of this invention uses a blend of acrylamide-acrylic polymers wherein one polymer is water soluble and the other polymer is a dispersed water-insoluble polymer. This nonpolluting composition forms a glossy, high-quality finish on metal substrates and is particularly adapted for use in high-speed sheet-metal coating lines, since the composition cures rapidly.

SUMMARY OF THE INVENTION

The aqueous coating composition of this invention comprises about 5-80% by weight of a binder of film-forming constituents and, correspondingly, about 20-95% by weight of water and up to 50% by weight of a solvent for the binder; wherein the binder consists essentially of A. about 5-95% by weight, based on the weight of the binder, of a water soluble acrylic polymer consisting essentially of
   (1) 5-30% by weight, based on the weight of the polymer, of isobutoxymethyl acrylamide;
   (2) 5-30% by weight, based on the weight of the polymer, of methyl methacrylate, styrene or a mixture of methyl methacrylate and styrene;
   (3) 5-60% by weight, based on the weight of the polymer, of an alkyl acrylate having 2-12 carbon atoms in the alkyl group or an alkyl methacrylate having 4-12 carbon atoms in the alkyl group; and
   (4) 5-15% by weight, of acrylic acid or methacrylic acid; wherein the polymer has an acid number of about 50-105 and a weight average molecular weight of about 5000-30,000; and, correspondingly, B. about 95-5% by weight, based on the weight of the binder, of a dispersed water insoluble acrylic resin that consists essentially of
   (1) 5-30% by weight, based on the weight of the resin, of butoxy methyl acrylamide or isobutoxy methyl acrylamide;
   (2) 5-30% by weight, based on the weight of the resin, of methyl methacrylate, styrene or a mixture of methyl methacrylate and styrene;
   (3) 5-64.9% by weight, based on the weight of the resin, of an alkyl acrylate having 2-12 carbon atoms in the alkyl group, or an alkyl methacrylate having 4-12 carbon atoms in the alkyl group; and
   (4) 0.1-3% by weight, based on the weight of the resin, of acrylic acid or methacrylic acid;

wherein the resin is uniformly dispersed in the composition and has a particle size of about $0.05$–$0.4\mu$ and has a weight average molecular weight of about 35,000-100,000; and wherein the composition is neutralized to a pH of about 7-10 with a basic compound.

DESCRIPTION OF THE INVENTION

The novel coating composition of this invention has a solids content of film-forming constituents of about 5-80% and, preferably, about 30-60%. The composition is usually pigmented and contains pigment in a pigment-volume concentration of about 5-30%.

The film-forming constituents of the novel coating composition comprise about 5-95% by weight of a water soluble acrylic polymer and, correspondingly, about 95-5% by weight of a dispersed water insoluble acrylic resin. Preferably, the novel coating composition contains about 55-65% by weight of the water soluble acrylic polymer and, correspondingly, about 65-55% by weight of the dispersed water insoluble acrylic resin.

The water soluble acrylic polymer has the following composition: 5-30% by weight of isobutoxy methyl acrylamide; 5-30% by weight of methyl methacrylate, styrene or a mixture of methyl methacrylate and styrene; 5-60% by weight of an alkyl acrylate that has 2-12 carbon atoms in the alkyl group or an alkyl methacrylate that has 4-12 carbon atoms in the alkyl group; and 5-15% by weight of acrylic acid or methacrylic acid. The polymer has an acid number of about 50–105 and a weight average molecular weight of about 5,000–30,000.

The following alkyl acrylates and alkyl methacrylates can be utilized in preparing the water-soluble acrylic polymer: ethyl acrylate, propyl acrylate, isopropyl acrylate, butyl acrylate, isobutyl acrylate, tertiary butyl acrylate, pentyl acrylate, hexyl acrylate, 2-ethylhexyl acrylate, octyl acrylate, nonyl acrylate, decyl acrylate, lauryl acrylate, butyl methacrylate, isobutyl methacrylate, hexyl methacrylate, 2-ethylhexyl methacrylate, octyl methacrylate, nonyl methacrylate, decyl methacrylate and lauryl methacrylate.

One preferred water-soluble acrylic polymer has the following composition: 7–17% by weight of isobutoxymethyl acrylamide, 23–32% by weight of methyl methacrylate, 45–55% by weight of ethyl acrylate and 6–10% by weight of acrylic acid. One particularly preferred water-soluble acrylic polymer contains 12–13% by weight of isobutoxymethyl acrylamide, 28–29% by weight of methyl methacrylate, 50–51% by weight of ethyl acrylate and 7.5–8.5% by weight of acrylic acid.

The water soluble acrylic polymer is prepared by conventional solution-polymerization techniques in which the monomers are added to a polymerization vessel containing solvent along with a polymerization catalyst and the mixture is reacted for about 1–6 hours at about 50–200° C. to form acrylic polymer having the aforementioned molecular weight.

Any of the conventional solvents can be utilized, such as toluene, xylene, butyl acetate, acetone, butanol, ethylene glycol monobutyl ether, ethylene glycol monoethyl ether, ethylene glycol monoethyl ether acetate, acetone, methyl isobutyl ketone, methyl ethyl ketone and other aliphatic, cycloaliphatic or aromatic hydrocarbons, esters, other ketones and other solvents which are non-reactive with the monomers that are conventionally utilized in the polymerization processes.

Suitable polymerization catalysts used to prepare the polymer are $t$-butyl perbenzoate, $t$-butyl peroxide, cumene hydroperoxide, azo-bisisobutyronitrile and the like.

The water soluble acrylic resin is utilized to disperse pigments and the resulting pigment dispersions are then added to the dispersed acrylic resin latex to form the novel coating composition of this invention. To achieve complete water solubility the water soluble acrylic polymer is blended with a bisic compound to form a water soluble salt and also is blended with a water miscible solvent such as butanol or ethylene glycol monobutyl ether and water. Pigment is added to this composition, and then the resulting composition is subjected to high-shear mixing conditions to disperse the pigments, such as sand milling, ball mililng, pebble milling and the like. The resulting pigment dispersions can then be added to the dispersion of the water insoluble acrylic resin to form the novel coating composition.

The water dispersed acrylic resin utilized in the novel coating composition of this invention contains the following constituents: 5–30% by weight of butoxymethyl acrylamide or isobutoxymethyl acrylamide; 5–30% by weight of methyl methacrylate, styrene or a mixture of methyl methacrylate and styrene; 5–64.9% by weight of an alkyl acrylate having 2–12 carbon atoms in the alkyl group or an alkyl methacrylate having 4–12 carbon atoms in the alkyl group; and 0.1–3% by weight of acrylic acid or methacrylic acid. The acrylic resin has a weight average molecular weight of about 35,000–100,000. The resin is uniformly dispersed in the novel composition and has a particle size of about 0.05–0.4µ. Any of the aforementioned alkyl acrylates or alkyl methacrylates can be utilized to prepare the water insoluble acrylate resin.

A preferred water insoluble acrylic resin contains 7–17% by weight of isobutoxymethyl acrylamide, 23–32% by weight of methyl methacrylate, 53–62% by weight of ethyl acrylate and 1–3% by weight of acrylic acid. One particularly preferred acrylic resin contains about 11–12% by weight of isobutoxymethyl acrylamide, 28–29% by weight of methyl methacrylate, 58–59% by weight of ethyl acrylate and 2–3% by weight of acrylic acid.

The water insoluble acrylic resin perferably is prepared by emulsion polymerization techniques in which the monomers are added to a solution containing a polymerization initiator and reacted for about 1–6 hours at about 60–98° C. Preferably, reaction is carried out for approximately 2–4 hours at about 60–80° C.

Any of the ordinary free-radical-generating vinyl-polymerization inititators capable of functioning in an aqueous medium can be used, such as persulfates, perbenzoates such as $t$-butyl perbenzoate, perborates, percarbonates, hydrogen peroxide and organic peroxides such as benzoyl peroxide. Preferably, a water soluble persulfate such as potassium, ammonium or sodium persulfate is utilized. A mercaptan such as dodecyl mercaptan is also utilized. A water-soluble basic compound is then added to neutralize the resin to form a stabilized composition.

The novel coating composition of this invention is then prepared by blending the mill bases of the water soluble acrylic resin with the above prepared dispersion of the water insoluble resin and then neutralizing the resulting composition to provide maximum stability. The resulting pH of the composition is about 7–10 but a pH of about 7.5–8.5 is preferred. Any of the following basic compounds can be utilized in this invention to adjust the pH or to neutralize either the water insoluble acrylic resin or the water soluble acrylic polymer and are, for example, ammonia, primary amines, secondary amines, tertiary amines, poly amines, hydroxy amines, water soluble metal hydroxides and the like. The following are examples of these compounds: monoethanolamine, diethanolamine, triethanolamine and N-methylethanol, N-aminoethanolamine, N-methyldiethanolamine, monoisopropylolamine, diisopropylolamine, triisopropylolamine, hydroxy amine, butanolamine, hexanolamine, methyldiethanolamine, octylamine, sodium hydroxide, potassium hydroxide, lithium hydroxide, ethylene diamine, diethylene triamine, triethylene tetraamine, hexamethylene tetraamine, tetraethylene diamine, propylene diamine and the like. Preferred compounds are a diethylethanolamine, dimethylethanolamine, triethylamine, and ammonia.

The following are examples of the many types of pigments that can be utilized in the novel coating composition of this invention: titanium dioxide, iron oxide, zinc oxide, metal hydroxides, metal flakes such as aluminum flake, metal powders, chromates, sulfates, carbonates, carbon black, silica, talc, phthalocyanine pigments, indanthrone pigments and other organic pigments and dyes.

A polyethylene wax in the form of an aqueous dispersion can be added to the novel coating composition to improve resistance to metal marking and mar resistance. About 0.3–6% by weight, based on the weight of the binder of the polyethylene wax can be used. Preferably, the polyethylene wax has a molecular weight of about 1000–3000.

The novel coating composition of this invention can be applied to a variety of substrates such as glass, plastics, metals and the like by any of the usual methods such as spraying, electrostatic spraying, dipping, brushing, flow-coating, electro-coating, coil-coating and the like. These coatings are then baked according to conventional procedures to form a finish.

Conventional baking conditions are for about 10–30 minutes at about 160–210° C. In a coil-coating operation in which the metal is coated rapidly and subsequently baked under accelerated conditions, the following baking conditions are used: 45–90 seconds at about 220–260° C. and, preferably, about 60 seconds at about 225° C. The resulting finish is about 0.5–5 mils thick, and preferably, about 1–3 mils thick and has excellent gloss and smoothness and provides a hard, durable, scratch and grease resistant finish which is suitable for appliances, vending machines, outdoor equipment and the like.

The novel coating compositions of this invention can be applied over a bare metal substrate but preferably is applied over a suitably treated or primed metal substrate, for example, phosphatized steel substrates such as those treated with zinc phosphate can be used. Also, metal substrates coated with a typical alkyd resin or epoxy resin primers pigmented with iron oxide, carbon black, titanium dioxide, and the like can be utilized. The composition can also be utilized directly over galvanized steel to form a durable finish.

The following Examples illustrate the invention. The parts and percentages are by weight unless otherwise specified.

EXAMPLE 1

An acrylic polymer dispersant solution is prepared as follows:

| | Parts by wt. |
|---|---|
| Portion 1: | |
| Butanol | 150.00 |
| Ethylene glycol monobutyl ether | 50.00 |
| Portion 2: | |
| Acrylic acid monomer | 40.46 |
| Isobutoxymethyl acrylamide monomer | 64.02 |
| Methyl methacrylate monomer | 144.66 |
| Ethyl acrylate monomer | 256.65 |
| Butanol | 51.94 |
| Portion 3: | |
| Tertiary dodecyl mercaptan sulfate | 3.54 |
| Ethylene glycol monobutyl ether | 20.00 |
| Portion 4: | |
| Tertiary butyl perbenzoate | 6.39 |
| Ethylene glycol monobutyl ether | 46.46 |
| Portion 5: | |
| Ethylene glycol monobutyl ether | 8.88 |
| Total | 843.00 |

Portion 1 is premixed and charged into a reaction vessel equipped with a stirrer, a reflux condenser, a thermometer, an inlet valve and a heating mantle and heated to a reflux temperature of about 116° C. The constituents of Portion 2 are added in the above order to a monomer feed tank with constant mixing. The constituents of Portion 3 are added in the order shown to the monomer feed tank and mixed with the monomers of Portion 2. The constituents of Portion 4 are added in the order shown to the monomer feed tank and mixed. The above monomer mixture from the feed tank is added at a slow and even rate to the reaction vessel over a three-hour period while maintaining the reaction mixture at a reflux temperature of about 124° C. Portion 5 is then added and the reaction mixture is maintained at the above reflux temperature for another 3 hours, and then the reaction mixture is cooled to room temperature.

The resulting polymer solution has a weight solids content of about 60.0% and a Gardner Holdt viscosity measured at 25° C. of about Y–$Z_1$ and the polymer has an acid number of about 59–63, a number average molecular weight of 6,000 and a weight average molecular weight of about 16,000 and has the following composition: isobutoxymethyl acrylamide/methyl methacrylate/ethyl acrylate/acrylic acid in a percentage of 12.66/28.6/50.74/8.

A white mill base is prepared as follows:

| | Parts by weight |
|---|---|
| Portion 1: | |
| Acrylic polymer dispersant solution (prepared above) | 150.0 |
| Diethyl ethanol amine | 9.4 |
| Butanol | 15.0 |
| Ethylene glycol monobutyl ether | 10.0 |
| Deionized water | 165.6 |
| Portion 2: | |
| Titanium dioxide pigment | 650.0 |
| Total | 1000.0 |

Portion 1 is charged into a mixing vessel and is mixed for 20 minutes and then charged into the mixing vessel and mixed for 1 hour. The mixture is then charged into a conventional 8-gallon sand mill and ground at a rate of 25 gallons per hour while maintaining the temperature at about 38–50° C. until the dispersion has a maximum fineness of about 0.5 mil. The resulting mill base has a pigment-volume concentration of about 68% and a solids content of about 74%.

An acrylic polyethylene dispersion is prepared as follows:

| | Parts by weight |
|---|---|
| Portion 1: | |
| Butanol | 23.9 |
| Xylene | 22.8 |
| Acrylic polymer dispersant solution (prepared above) | 28.9 |
| Diethylethanol amine | 1.4 |
| Polyethylene Wax (Having a molecular weight of about 2000 and a melting point of 105° C.) | 11.8 |
| Portion 2: | |
| Xylene | 8.0 |
| Hydrocarbon solvent (BP 150–190° C. and aniline point −28° C.) | 3.2 |
| Total | 100.0 |

Portion 1 is charged into a conventional sand mill and ground; then Portion 2 is added and ground to provide a uniform dispersion.

An acrylic polymer latex is prepared as follows:

| | Parts by weight |
|---|---|
| Portion 1: | |
| Ester solution (30% solids in water of the disodium salt of the half ester of sulfosuccinic acid derived from a $C_{10}$–$C_{12}$ straight-chain ethoxylated alcohol mixture) | 30.91 |
| Deionized water | 423.37 |
| Portion 2: | |
| Ammonium persulfate | 1.92 |
| Deionized water | 14.30 |
| Portion 3: | |
| Ethyl acrylate monomer | 22.32 |
| Methyl methacrylate monomer | 10.85 |
| Isobutoxymethyl acrylamide monomer | 4.42 |
| Portion 4: | |
| Dodecyl mercaptan | 0.38 |
| Portion 5: | |
| Ethyl acrylate monomer | 66.96 |
| Methyl methacrylate monomer | 32.54 |
| Isobutoxy methyl acrylamide monomer | 13.25 |
| Portion 6: | |
| Ammonium persulfate | 3.46 |
| Portion 7: | |
| Ethyl acrylate monomer | 133.92 |
| Methyl methacrylate monomer | 65.09 |
| Isobutoxy methyl acrylamide monomer | 26.49 |
| Acrylic acid monomer | 8.16 |
| Portion 8: | |
| Diethyl ethanol amine | 9.28 |
| Deionized water | 36.77 |
| Total | 904.39 |

Portion 1 is charged into a reaction vessel equipped with a stirrer, a reflux condenser, a thermometer, an inlet valve and a heating mantle and heated to 65° C. Portion 2 is premixed and then added to the reaction vessel. Portion 3 is premixed and added to the reaction vessel. Portion 4 is added at the same time as Portion 3 with constant agitation and the exothermic reaction raises the temperature of the reaction mixture to 78° C. and then the mixture is cooled to 65° C. Portion 5 is premixed and slowly added at a uniform rate to the reaction mixture over a 60-minute period while maintaining the temperature of the reaction mixture at 65° C. About 0.3 parts of Portion 6 are added at the beginning of the addition of Portion 5, and then 0.3 parts of Portion 6 are added every 15-minute period for 3 hours during the additions of Portions 5 and 7 until all of Portion 6 is used. Portion 7 is premixed and is slowly added at a uniform rate over a 2-hour period after Portion 5 is added. Portion 8 is premixed and added over a 10-minute period to the reaction mixture, and the mixture is stirred for an additional 30 minutes and then cooled to room temperature.

The resulting latex has a polymer solids content of about 43.5% and a viscosity of about 125 centipoises measured using a No. 1 spindle at 20 revolutions per minute. The polymer has an acid number of about 15 and a number average molecular weight of about 18,000–25,000 and a weight average molecular weight of about 45,000–60,000 and has the following composition: isobutoxy methyl acrylamide/methyl methacrylate/ethyl acrylate/acrylic acid in a percentage of 11.50/28.25/58.12/2.13.

An acrylic flatting dispersion is prepared as follows:

| Portion 1: | Parts by weight |
|---|---|
| Acrylic polymer dispersant solution (prepared above) | 12.00 |
| Diethyl ethanol amine | 0.57 |
| Deionized water | 35.00 |
| Portion 2: | |
| Amorphous silica powder (SiO$_2$ having an average diameter of about 9$\mu$) | 20.00 |
| Portion 3: | |
| Acrylic latex (prepared above) | 32.43 |
| Total | 100.00 |

The ingredients of Portion 1 are added in the order shown to a mixing vessel with mixing and then mixed an additional 10 minuten. Portion 2 is slowly added with mixing and then the composition is mixed 2 hours. Portion 3 is then added with mixing, and the dispersion is mixed an additional 30 minutes.

A coating composition is prepared as follows:

| Portion 1: | Parts by weight |
|---|---|
| White mill base (prepared above) | 425.00 |
| Acrylic flatting dispersion (prepared above) | 209.00 |
| Acrylic polyethylene dispersion (prepared above) | 35.00 |
| Acrylic polymer latex (prepared above) | 392.00 |
| Portion 2: | |
| Acrylic flatting dispersion (prepared above) | 25.00 |
| Total | 1086.00 |

The constituents of Portion 1 are charged into a mixing vessel in the order shown, and the constituents are mixed for one hour. Portion 2 is then added and thoroughly mixed to form the coating composition.

The coating composition is used in a conventional coil-coating machine wherein the composition is applied to a steel sheet and baked for 60 seconds at about 238° C. The resulting finish is about 1 mil thick; is smooth, glossy and flexible; and has excellent mar and scratch resistance.

A still panel is sprayed with the above coating composition and baked for about 30 minutes at about 165° C. The resulting finish is 1.5 mils thick; is smooth, even, glossy, and flexible; and is resistant to mars and scratches.

What I claim is:

1. An aqueous coating composition comprising about 5–80% by weight of a binder of film-forming constituents and, correspondingly, 95–20% by weight of water and up to 50% by weight of a solvent for the binder; wherein the binder consists essentially of
   A. about 5–95% by weight, based on the weight of the binder, of a water soluble acrylic polymer consisting essentially of
   (1) 5–30% by weight, based on the weight of the polymer, of isobutoxymethyl acrylamide;
   (2) 5–30% by weight, based on the weight of the polymer, of methyl methacrylate, styrene or a mixture of methyl methacrylate and styrene;
   (3) 5–60% by weight, based on the weight of the polymer, of an alkyl acrylate, having 2–12 carbon atoms in the alkyl group or an alkyl methacrylate having 4–12 carbon atoms in the alkyl group; and
   (4) 5–15% by weight of acrylic acid or methacrylic acid;
   wherein the polymer has an acid number of about 50–105 and a weight average molecular weight of about 5,000–30,000; and, correspondingly,
   B. about 95–5% by weight, based on the weight of the binder, of a dispersed water insoluble acrylic resin consisting essentially of
   (1) 5–30% by weight, based on the weight of the resin, of butoxymethyl acrylamide or isobutoxymethyl acrylamide;
   (2) 5–30% by weight, based on the weight of the resin, of methyl methacrylate, styrene or a mixture of methyl methacrylate and styrene;
   (3) 5–64.9% by weight, based on the weight of the resin, of an alkyl acrylate having 2–12 carbon atoms in the alkyl group or an alkyl methacrylate having 4–12 carbon atoms in the alkyl group; and
   (4) 0.1–3% by weight, based on the wieght of the resin, of acrylic acid or methacrylic acid;
   wherein the resin is uniformly dispersed in the composition and has a particle size of about 0.05–0.4$\mu$ and a weight average molecular weight of about 35,000–100,000; and wherein the composition is neutralized to a pH of about 7–10 with a basic compound.

2. The coating composition of Claim 1 containing pigment in a pigment-volume concentration of 5–30%.

3. The coating composition of Claim 2 in which the binder consists essentially of
   A. 55–65% by weight of the water soluble acrylic polymer and, correspondingly,
   B. 65–55% by weight of the dispersed water insoluble acrylic resin.

4. The coating composition of Claim 3 in which the water soluble acrylic polymer consists essentially of
   A. 7–17% by weight of isobutoxymethyl acrylamide,
   B. 23–32% by weight of methyl methacrylate,
   C. 45–55% by weight of ethyl acrylate, and
   D. 6–10% by weight of acrylic acid.

5. The coating composition of Claim 3 in which the water-insoluble acrylic resin consists essentially of
   A. 7–17% by weight of isobutoxy methyl acrylamide,
   B. 23–32% by weight of methyl methacrylate,
   C. 53–62% by weight of ethyl acrylate and
   D. 1–3% by weight of acrylic acid.

6. The coating composition of Claim 3 in which the pH is about 7.5–8.5 and in which the composition is neutralized with a primary amine, a secondary amine, a tertiary amine, a poly amine, a hydroxy amine, ammonia or an alkali metal hydroxide.

7. The coating composition of Claim 1 comprising about 40–70% by weight of a binder of film-forming constituents and, correspondingly, about 30–60% by weight of water and up to 20% by weight of a solvent for the binder and containing pigment in a pigment-volume concentration of about 5–30%; wherein the binder consists essentially of
   A. 55–65% by weight, based on the weight of the binder, of a water soluble acrylic polymer consisting essentially of
   (1) 7–17% by weight of isobutoxy methyl acrylamide,
   (2) 23–32% by weight of methyl methacrylate, (3) 45–55% by weight of ethyl acrylate and
(4) 6–10% by weight of acrylic acid; and
correspondingly,
B. 65–55% by weight, based on the weight of the binder, of a uniformly dispersed water insoluble acrylic resin consisting essentially of
   (1) 7–17% by weight of isobutoxy methyl acrylamide,
   (2) 23–33% by weight of methyl methacrylate,
   (3) 53–62% by weight of ethyl acrylate,
   (4) 1–3% by weight of acrylic acid;
wherein the composition is neutralized to a pH of about 7.5–8.5 with a basic compound of the group diethylethanolamine, dimethyl ethanolamine, triethylamine, potassium hydroxide or ammonia.

References Cited

UNITED STATES PATENTS

| | | | |
|---|---|---|---|
| 2,870,116 | 1/1959 | Vogel, et al. | 260—45.5 |
| 2,978,437 | 4/1961 | Christenson | 260—72 |
| 3,079,434 | 2/1963 | Christenson, et al. | 260—561 |
| 3,087,965 | 4/1963 | Dowbenko, et al. | 260—561 |
| 3,118,852 | 1/1964 | Christenson et al. | 260—45.2 |
| 3,118,853 | 1/1964 | Hart, et al. | 260—45.2 |
| 3,247,139 | 4/1966 | Christenson, et al. | 260—21 |

OTHER REFERENCES

Tadashi, et al.: *Chemical Abstracts*, vol. 77: 154,077g (1972).

Tadasu, et al.: *Chemical Abstracts*, vol. 77: 116,185h (1972).

Tamai, et al.: *Chemical Abstracts*, vol. 67: 12,559k (1967).

MELVIN GOLDSTEIN, Primary Examiner

W. C. DANISON, JR., Assistant Examiner

U.S. Cl. X.R.

117—132 B, 161 P, 161 UZ, 161 UT, 161 UC; 260—901